US008909967B1

(12) United States Patent
van Dijk

(10) Patent No.: US 8,909,967 B1
(45) Date of Patent: Dec. 9, 2014

(54) TECHNIQUE FOR SECURE COMPUTATION

(71) Applicant: EMC Corporation, Hopkinton, MA (US)

(72) Inventor: Marten van Dijk, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 119 days.

(21) Appl. No.: 13/731,883

(22) Filed: Dec. 31, 2012

(51) Int. Cl.
*G06F 21/55* (2013.01)
*H04L 9/00* (2006.01)
*G06F 12/14* (2006.01)

(52) U.S. Cl.
CPC .... *G06F 12/1408* (2013.01); *G06F 2221/2123* (2013.01); *G06F 21/558* (2013.01); *G06F 2207/7261* (2013.01)
USPC ........... 713/330; 713/150; 713/151; 713/152; 713/153; 713/154; 713/162; 713/164; 713/165; 713/166; 713/167; 713/182; 713/189; 713/190; 713/193; 713/300

(58) Field of Classification Search
CPC ................ G06F 2207/7261; G06F 2207/7233; G06F 1/26; G06F 9/30003; G06F 17/5022; G06F 21/00; G06F 21/75; G06F 21/77; G06F 21/558; G06F 2221/2123; H04L 9/002; H04L 9/003; H04L 9/0861; H04L 2209/04; H04L 2209/043; H04L 2209/046
USPC ......... 713/330, 150–154, 162, 164–167, 182, 713/189, 190, 193, 300
See application file for complete search history.

(56) References Cited

U.S. PATENT DOCUMENTS

| 6,804,782 B1* | 10/2004 | Qiu et al. ...................... 713/194 |
| 2005/0149661 A1* | 7/2005 | Poulton et al. .................... 711/1 |
| 2008/0140995 A1* | 6/2008 | Fukazawa ..................... 712/205 |
| 2010/0223434 A1* | 9/2010 | Dupaquis et al. ............. 711/154 |

FOREIGN PATENT DOCUMENTS

JP          2005244567 A   *   9/2005

OTHER PUBLICATIONS

"Multiple-Valued Constant-Power Adder for Cryptographic Processors" by Yuichi Baba, Atsushi Miyamoto, Naofumi Homma and Takafumi Aoki, published in "Multiple-Valued Logic, 2009. ISMVL '09. $39^{th}$ International Symposium" on May 21-23, 2009, pp. 239-244.*
R. Rivest, L. Adleman, and M.L. Dertouzos, "On data banks and privacy homomorphisms. Foundations of Secure Computation," Massachusetts Institute of Technology, Cambridge, MA, pp. 169-180, (1978).

(Continued)

*Primary Examiner* — Joseph P. Hirl
*Assistant Examiner* — Kalish Bell
(74) *Attorney, Agent, or Firm* — BainwoodHuang

(57) ABSTRACT

A technique for secure computation obfuscates program execution such that observers cannot detect what instructions are being run at any given time. Rather, program execution and memory access patterns are made to appear uniform. A processor operates based on encrypted inputs and produces encrypted outputs. In various examples, obfuscation is achieved by exercising computational circuits in a similar way for a wide range of instructions, such that all such instructions, regardless of their operational differences, affect the processor's power dissipation and processing time substantially uniformly. Obfuscation is further achieved by limiting memory accesses to predetermined time intervals, with memory interface circuits exercised regardless of whether a running program requires a memory access or not. The resulting processor thus reduces leakage of any meaningful information relating to the program or its inputs, which could otherwise be detectable to observers.

17 Claims, 8 Drawing Sheets

(56) References Cited

OTHER PUBLICATIONS

O. Goldreich, "Towards a theory of software protection and simulation on oblivious rams," Proceeding STOC '87, Proceedings of the nineteenth annual ACM symposium on Theory of computing, ACM New York, NY, pp. 182-194 (1987).
R. Ostrovsky, "Efficient computation on oblivious rams," STOC '90 Proceedings of the twenty-second annual ACM symposium on Theory of computing, ACM, New York, NY, pp. 514-523 (1990).
Rummery et al., "On-Line Q-Learning Using Connectionist Systems," Cambridge University Engineering Department, England (Sep. 1994).
W. Arbaugh, D. Farber, and J. Smith, "A Secure and Reliable Bootstrap Architecture," Proceedings of the 1997 IEEE Symposium on Security and Privacy, Philadelphia, PA, pp. 65-71 (1997).
Oded Goldreich and Rafail Ostrovsky. Software Protection and Simulation on Oblivious RAMs. Journal of the ACM (JACM) JACM Homepage archive vol. 43 Issue 3, ACM, New York, NY, pp. 431-473 (May 1996).
S. W. Smith and S. H. Weingart, "Building a High-Performance, Programmable Secure Coprocessor," Computer Networks (Special Issue on Computer Network Security), 31(9), Elsevier North-Holland, Inc. New York, NY, pp. 831-860 (1999).
Sutton & Barto, "Reinforcement Learning: An Introduction," Journal of Cognitive Neuroscience 11:1, The MIT Press, Cambridge, MA, pp. 126-134 (1999).
David Lie, Chandramohan Thekkath, Mark Mitchell, Patrick Lincoln, Dan Boneh, John Mitchell, and Mark Horowitz, "Architectural Support for Copy and Tamper Resistant Software," Proceedings of the 9th Int'l Conference on Architectural Support for Programming Languages and Operating Systems (ASPLOS-IX), Cambridge, MA (2000).
Jose Renau, Basilio Fraguela, and Liu Wei, "Sesc: Superescalar simulator," Technical report, University of Illinois Urbana-Champaign, ECE department, (Mar. 2002).
Blaise Gassend, G. Edward Suh, Dwaine Clarke, Marten van Dijk, and Srinivas Devadas, "Caches and Merkle Trees for Efficient Memory Integrity Verification," Proceedings of Ninth International Symposium on High Performance Computer Architecture (2002).
D. Lie, J. Mitchell, C. Thekkath, and M. Horwitz, "Specifying and verifying hardware for tamper-resistant software," Proceedings of the IEEE Symposium on Security and Privacy, (2003).
D. Lie, C. Thekkath, and M. Horowitz. "Implementing an untrusted operating system on trusted hardware," Proceedings of the Nineteenth ACM Symposium on Operating Systems Principles, Bolton Landing, New York (Oct. 2003).
G. Edward Suh, Dwaine Clarke, Blaise Gassend, Marten van Dijk, and Srinivas Devadas, "AEGIS: Architecture for Tamper-Evident and Tamper-Resistant Processing," MIT-CSAIL-CSG-Memo-474 Cambridge, MA (2004).
Tiago Alves and Don Felton, "Trustzone: Integrated hardware and software security," Information Quarterly 3(4), pp. 18-24 (2004).
Trusted Computing Group, "TCG Specification Architecture Overview" Revision 1.4, http://www.trustedcomputinggroup.com/home, (2004).
Xiaotong Zhuang, Tao Zhang, and Santosh Pande, "HIDE: an infrastructure for efficiently protecting information leakage on the address bus," ASPLOS-XI: Proceedings of the 11th international conference on Architectural support for programming languages and operating systems, ACM Press, Boston, MA (2004).
Ruby B. Lee, Peter C. S. Kwan, John P. McGregor, Jeffrey Dwoskin, and Zhenghong Wang, "Architecture for protecting critical secrets in microprocessors," Proceedings of the 32nd International Symposium on Computer Architecture, (2005).
G. Edward Suh, Charles W. O'Donnell, Ishan Sachdev, and Srinivas Devadas, "Design and Implementation of the AEGIS Single-Chip Secure Processor Using Physical Random Functions," Proceedings of the 32nd Annual International Symposium on Computer Architecture, (2005).
David Grawrock, "The Intel Safer Computing Initiative: Building Blocks for Trusted Computing," Intel Press, Hillsboro, OR (2006).
Luis F. G. Sarmenta, Marten van Dijk, Charles W. O'Donnell, Jonathan Rhodes, and Srinivas Devadas, "Virtual Monotonic Counters and Count-Limited Objects using a TPM without a Trusted OS," Proceedings of the 1st ACM CCS Workshop on Scalable Trusted Computing, Alexandria VA (Nov. 2006).
Darryl Gove. Cpu2006 working set size. SIGARCH Comput. Archit. News, 35(1):90-96, (Mar. 2007).
Nate Lawson, "TPM hardware attacks," (http://rdist.root.org/2007/07/16/tpm-hardware-attacks/) root labs rdist, (Jul. 16, 2007).
Nate Lawson, "TPM hardware attacks (part 2)," root labs rdist, (http://rdist.root.org/2007/07/17/tpm-hardware-attacks-part-2/) (Jul. 17, 2007).
V. Costan, L. F. G. Sarmenta, M. van Dijk, and S. Devadas, "The trusted execution module: Commodity general-purpose trusted computing," CARDIS '08 Proceedings of the 8th IFIP WG 8.8/11.2 international conference on Smart Card Research and Advanced Applications, (2008).
Jonathan M. McCune, Bryan Parno, Adrian Perrig, Michael K. Reiter, and Arvind Seshadri, "How low can you go?: recommendations for hardware-supported minimal tcb code execution," Proceedings of the 13th international conference on Architectural support for programming languages and operating systems, ASPLOS '08, Seattle, WA (Mar. 2008).
Craig Gentry, "A fully homomorphic encryption scheme," PhD thesis, Stanford University, (Sep. 2009).
Craig Gentry, "Fully homomorphic encryption using ideal lattices," In STOC'09, Bethesda, MD, pp. 169-178 (2009).
M. T. Goodrich, "Randomized shellsort: A simple oblivious sorting algorithm" In Proceedings 21st ACM-SIAM Symposium on Discrete Algorithms (SODA), 1262-1277 (2010).
Jonathan M. McCune, Yanlin Li, Ning Qu, Zongwei Zhou, Anupam Datta, Virgil D. Gligor, and Adrian Perrig, "Trustvisor: Efficient tcb reduction and attestation," IEEE Symposium on Security and Privacy, (2010).
E. Shi T.-H. H. Chan, E. Stefanov, and M. Li, "Oblivious ram with o((log n)3) worst-case cost," Advances in Cryptology—ASIACRYPT Lecture Notes in Computer Science vol. 7073, (2011).
N.P. Smart and F. Vercauteren, "Fully Homomorphic SIMD Operations," Designs, Codes and Cryptography (Jul. 2012).
Christopher Fletcher, Marten van Dijk, and Srinivas Devadas. Compilation techniques for efficient encrypted computation. Cryptology ePrint Archive (http://eprint.iacr.org/), (2012).
Michael Brenner, Jan Wiebelitz, Gabriele von Voigt, and Matthew Smith. "Secret program execution in the cloud applying homomorphic encryption," I5th IEEE International Conference on Digital Ecosystems and Technologies (IEEE DEST 2011), Daejeon, Korea, pp. 114-119 ( May 2011).
C. Gentry, S. Halevi, and N.P. Smart, "Fully homomorphic encryption with polylog overhead," Advances in Cryptology—EUROCRYPT 2012 Lecture Notes in Computer Science vol. 7237, (2012).
C. Gentry, S. Halevi, and N.P. Smart, "Homomorphic Evaluation of the AES Circuit," Lecture Notes in Computer Science vol. 7417, (Jun. 2012).
E. Stefanov, E. Shi, and D. Song, "Towards practical oblivious ram," In NDSS, arXiv:1106.3652v5 [cs.CR], (2012).
E. Stefanov and E. Shi, "Path O-RAM: An Extremely Simple Oblivious RAM Protocol," Cornell University Library, arXiv:1202.5150v1, (arxiv.org/abs/1202.5150), (2013).
Microsoft. Next-Generation Secure Computing Base. (http://www.microsoft.com/resources/ngscb/defaul.mspx).

* cited by examiner

Cycles to get a block of data/instructions from ORAM interface (Section 4):

$$access\_oram(\text{ORAM 1}) = aes\_latency + 2 * \left(ram\_latency + \left\lceil \log_2\left(\frac{working\_set}{block\_size}\right)\right\rceil\right) * 4 * \frac{2^7 + 32}{16} + Z * \frac{block\_size + 32}{pin\_bandwidth}$$

$$= 100 + 2 * \left(50 + \left\lceil \log_2\left(\frac{2^{34}}{2^7}\right)\right\rceil\right) * 4 * \frac{2^7 + 32}{16} = 2360 \text{ cycles}$$

$$capacity(\text{ORAM 2}) = \frac{\left\lceil \log_2\left(\frac{working\_set}{block\_size}\right)\right\rceil - 1}{8} * \frac{2^{34}}{2^7} = \frac{\log_2\left(\frac{2^{34}}{2^7}\right) - 1}{8} = 416 \text{ MBytes}$$

$$access\_oram(\text{ORAM 2}) = 100 + 2 * \left(50 + \left\lceil \log_2\left(\frac{capacity(\text{ORAM 2})}{2^7}\right)\right\rceil\right) * 4 * \frac{2^7 + 32}{16} = 1960 \text{ cycles}$$

$$capacity(\text{ORAM 3}) = \frac{\left\lceil \log_2\left(\frac{capacity(\text{ORAM 2})}{block\_size}\right)\right\rceil - 1}{8} \approx 8.5 \text{ MBytes}$$

$$access\_oram(\text{ORAM 3}) = 100 + 2 * \left(50 + \left\lceil \log_2\left(\frac{capacity(\text{ORAM 3})}{2^7}\right)\right\rceil\right) * 4 * \frac{2^7 + 32}{16} \approx 1560 \text{ cycles}$$

$$position\_map(\text{ORAM 3}) = \frac{\left\lceil \log_2\left(\frac{capacity(\text{ORAM 3})}{block\_size}\right)\right\rceil - 1}{8} \approx 136.5 \text{ KBytes}$$

$$total\_latency\_per\_oram\_access \approx 2360 + 1960 + 1560 = 5880 \text{ cycles}$$

*FIG. 3B*

TECHNIQUE FOR SECURE COMPUTATION

BACKGROUND

Researchers have developed a variety of approaches for promoting secure computation. For example, fully homomorphic encryption (FHE) provides encrypted computation without restricting the processor or the programs that run. FHE allows a server to receive encrypted data and to perform, without access to a secret decryption key, arbitrarily-complex dynamically-chosen computations on data while the data remains encrypted. Secure computation on user inputs can be assured even when the processor and the software stack are untrusted.

Oblivious RAMs (ORAMs) introduce algorithms to completely stop any information leakage through memory access patterns. Some variants of ORAM techniques use the idea of probabilistic oblivious RAM and protect against information leaks by randomly shuffling memory locations before the same location gets accessed twice.

Trusted platform modules (TPMs) are chips soldered to motherboards of processing systems. A TPM defines a limited set of entities (such as shielded locations holding cryptographic keys or hashes), as well as a closed set of operations that can be performed with primitives (such as using a key to unwrap another key or to sign a piece of data).

SUMMARY

Unfortunately, most prior approaches to secure computing are incomplete or impractical. For example, FHE, although highly effective, involves a great performance penalty and can only be used for the smallest computing tasks. ORAMs, while they successfully hide memory access patterns, do not hide processor activity. For example, ORAMs have no effect on the speed of completing certain processing tasks. An observer of a system with an ORAM can thus correlate outwardly observable factors, detectable from physical processor pins or thermal profiles, with particular processing activities. TPMs have very limited functionality and are not suitable for general-purpose processing.

In contrast with the prior approaches, an improved technique for secure computation obfuscates program execution such that observers cannot detect what instructions are being run at any given time. Rather, program execution and memory access patterns are made to appear uniform. A processor operates based on encrypted inputs and produces encrypted outputs. In various examples, obfuscation is achieved by exercising computational circuits in a similar way for a wide range of instructions, such that all such instructions, regardless of their operational differences, affect the processor's power dissipation and processing time substantially uniformly. Obfuscation is further achieved by limiting memory accesses to predetermined time intervals, with memory interface circuits exercised regardless of whether a running program requires a memory access or not. The resulting processor thus reduces leakage of any meaningful information relating to the program or its inputs, which could otherwise be detectable to observers.

Certain embodiments are directed to a method of performing secure computation. The method includes executing a program A on a processor, the program A having particular processing requirements and particular memory access requirements. The method further includes obfuscating computational activity on A by exercising computational circuits of the processor in a uniform manner across different instructions in A, even when the different instructions do not operationally require the computational circuits to be exercised uniformly. The method still further includes obfuscating memory access patterns for activity in A by exercising memory interface circuits on a regular basis, even when exercising the memory interface circuits is not required each time to advance A. The processor thus presents to outside observers uniform power consumption and uniform memory access patterns regardless of the particular processing and memory access requirements of A.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

FIG. 3B is a diagram showing example computations for the secure processor of FIGS. 1 and 3A;

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for secure computation obfuscates program execution such that observers cannot detect what instructions are being run at any given time. A similar technique to that disclosed herein has been described in a paper entitled, "A Secure Processor Architecture for Encrypted Computation on Untrusted Programs," by Marten van Dijk, the inventor hereof, Christopher Fletcher, and Srinivas Devadas (Proceedings of the seventh ACM workshop on Scalable trusted computing, 2012), the content and teachings of which are incorporated herein by reference in their entirety.

To provide a motivating example for the improved technique, suppose a user has encrypted W2 statements (denoted M) and wants an untrusted server to process tax returns (for example the server might run the commercial tax program, denoted A). The server will load A onto a secure processor along with M and return to the user the encrypted results (conceptually A(M)) when the tax program indicates that it is done. The server may be configured to faithfully file the tax returns. Because the server is curious to learn about the users' taxes, however, the server may run additional programs on M on the side in order to try to learn more about M. For example, the server may decide to run the program shown in Algorithm 1 on M, as demonstrated by the following pseudo-code example:

Algorithm 1.

A simple program that can compromise the user's encrypted data M. The symbol "&" designates the bitwise AND operation.
1. y=M[0]
2. while (y & 1)=? 0 do
3. issue a random load or store request from/to memory
4. end while Here, the server will be able to detect if the low-order bit of some word in M equals 0 by monitoring how long the program takes to run (e.g., if the program finishes instantly or appears to be stuck in the loop) and whether the program produces a stream of memory requests. Presumably, the server knows the general format of M (e.g., that it is a W2 statement) and can therefore decrypt M in a bit-wise fashion given enough time.

Even if A is not malicious by design, passive observers and eavesdroppers can still learn about M because of program bugs in A. Hypothetically, a program bug can cause an equivalent effect as Algorithm 1. Writing and compiling programs that are provably secure in this sense (indistinguishable given arbitrary inputs) is a difficult problem.

Figure 1:
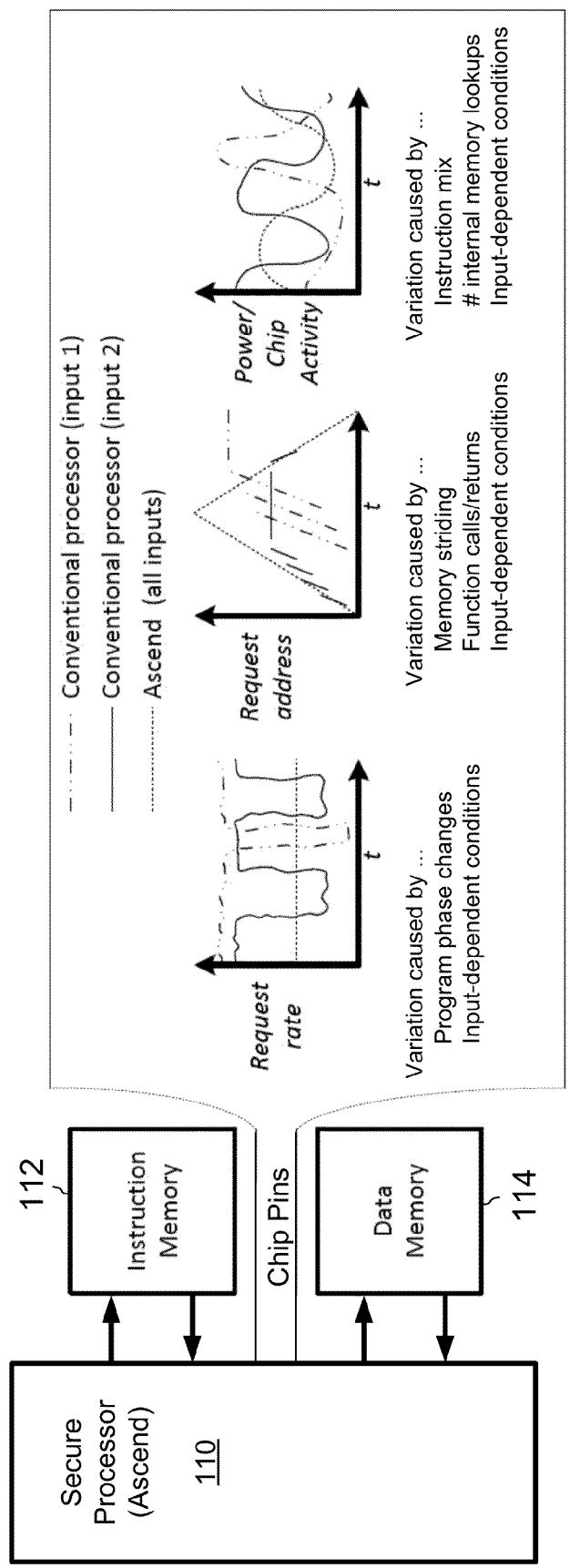
FIG. 1 is a block diagram of an example secure processor according to embodiments hereof.

FIG. 1 shows an example secure processor 110, referred to herein as "Ascend" (Architecture for Secure Computation on Encrypted Data). Ascend supports private computation of arbitrary programs with limited operating system-like support and a semi-honest server. Security is independent of the program that uses the data. As shown in FIG. 1, a feature of Ascend 110 is to obfuscate program behavior at processor chip pins. The graphs shown to the right of FIG. 1 represent a single program run with different inputs.

Given arbitrary A, for any two M and M', an outside observer should not be able to distinguish between:
1. the sequence of instructions being executed within the secure processor 110 to make forward progress in A, regardless of whether A(M) or A(M') has been running (instruction obfuscation).
2. the sequence of memory requests from the secure processor 110 to the outside/untrusted world produced while making forward progress in A, regardless of A(M) or A(M') (memory obfuscation).

These conditions have two implications. First, outside observers should not be able to tell when a program running within the secure processor 110 completes. Second, the secure processor 110 attains the same level of security as oblivious computation.

It is assumed for purposes of this description that untrusted parties have black box access to the secure processor 110 chip (or chips); e.g., they can observe the secure processor's external pins and apply arbitrary inputs to those pins at arbitrary times. In particular, it is assumed that the secure processor 110 is tamper-proof and that attackers cannot "look inside" the chip(s). If an attacker has a theoretically perfect heat camera that can determine the bit patterns of arbitrary internal buses at a cycle-granularity, the secure processor 110 can be breached.

The secure processor 110 fetches instructions of its chosen ISA (instruction set architecture) and is capable of executing each instruction on encrypted inputs to produce encrypted outputs. To prevent leakage and side-channel attacks, the secure processor 110 does not expose decrypted data/program state to the outside world and gives off a power and timing signature that is substantially independent of the program and data set being run. In particular, the secure processor's fetch-execute pipeline is obfuscated in the sense that an outside observer should not be able to tell what instruction is being executed at a given time provided program control flow depends on encrypted data. All accesses to instruction and data memory must be obfuscated using oblivious RAM (ORAM) techniques (to hide the memory access patterns). Furthermore, hardware controllers internal to the secure processor 110 stall ORAM requests from proceeding until public time intervals have passed (to prevent an observer from learning based on the frequency of memory accesses). The adversary learns an estimate of the number of clock cycles required to complete the computation, which can be shown to be the least amount of leakage possible. In the W2 tax example above, running an arbitrary W2 M on Algorithm 1 within the secure processor 110 would take the same cycle/power consumption and make an indistinguishable sequence of memory accesses over time (e.g., give off the appearance of having entered the while loop regardless of whether it actually entered the loop). Initial performance results show that the secure processor 110 performs with between 6.8-10.3 times slower, compared to similar processors running without encryption and 28 times slower when compared against a top-of-the-line processor. This makes the secure processor's overhead similar to that of running programs in interpreted languages.

The secure processor 110 is marginally more complex than a conventional processor, in the sense that the secure processor 110 must implement an ISA and also make sure that the work it does is sufficiently obfuscated. The secure processor 110 uses ORAM techniques to make requests to/from memory (e.g., instruction memory 112 and data memory 114) and assumes that trusted ORAM client-side logic is built inside of the secure processor 110 (this mechanism can be viewed as a hardware memory controller primitive).

In an example, the secure processor 110 is a coprocessor inside a server. We define an "untrusted server" as a software stack/OS running outside of Ascend, and hardware resources such as external RAM that are accessible by the secure processor 110. In an example, the secure processor 110 neither trusts nor implements any part of the server's software stack or operating system, internally or otherwise.

Framework

We introduce a general framework for performing computation under encryption for arbitrary programs. Black box symmetric-key encrypt( . . . ) and decrypt( . . . ) functions are assumed. These functions take a plaintext/ciphertext as input and return the corresponding ciphertext/plaintext using randomized encryption or decryption.

The secure processor 110 is modeled as a tamper-proof black box that has input/output pins which it uses to make requests to the outside world. The secure processor 110 has an oblivious RAM (ORAM) interface to an external RAM (where the external RAM is under the server's control). The secure processor's ORAM interface is functionally a read/write controller to memory such that an observer learns nothing about the data being accessed or the sequence of program address requests made over time, despite the RAM being stored external to the secure processor 110. Time is measured in clock cycles.

Figure 2:
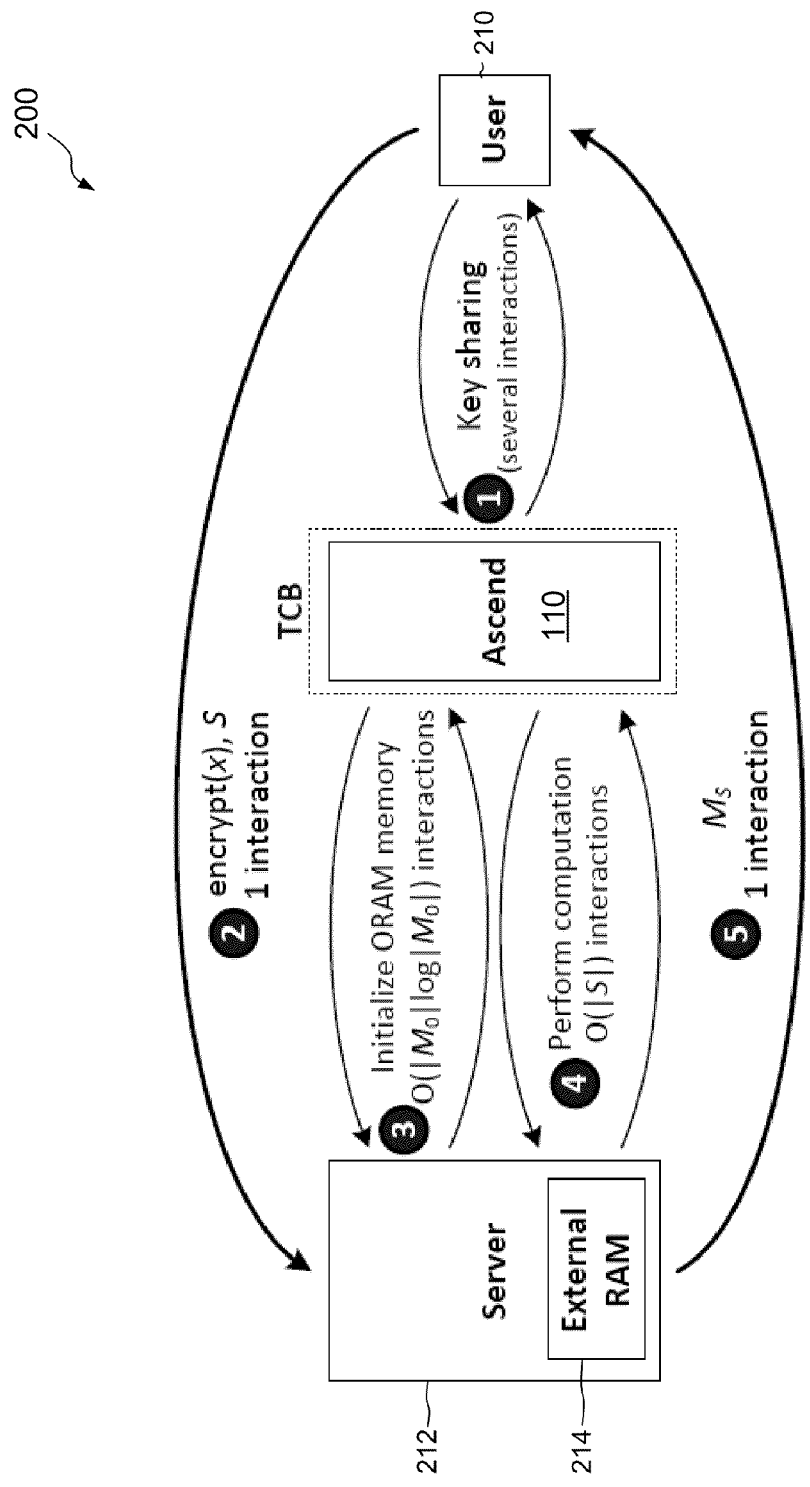
FIG. 2 is a block diagram of an example environment of the secure processor of FIG. 1, which illustrates an example secure processing protocol.

FIG. 2 shows an example two-interactive protocol 200 between a trusted user machine 210 (also called a "user"), a server 212 and the secure processor 110. The only trusted entity in FIG. 2 is the secure processor 110. Neither the server 212 nor any arrow (which would be implemented as a bus, channel, etc.) is trusted. The server 212 has an external RAM 214. Suppose the user wants the server 212 to evaluate deterministic algorithm A (made up of instructions) on inputs from the user, collectively denoted by x, and inputs from the server 212, collectively denoted by y. Formally, a two-interactive protocol Π for computing on A runs as follows (encircled numbers in FIG. 2 refer to the following steps):

Step 1. The user shares a secret (symmetric) key securely with the secure processor 110. In an example, the secure processor 110 is equipped with a private key and a certified public key.

Step 2. The user encrypts its inputs x using the chosen symmetric key to form the ciphertext encrypt(x) and then chooses a number of cycles S, which is the time/energy budget that the user 210 is willing to pay the server to compute on A. The user 210 then transmits to the server 212 the pair (encrypt(x); S) together with algorithm A, if the server 212 is not providing A.

Step 3. (Initialization) After receiving the pair (encrypt(x); S) and optionally A, the server 212 engages in an interactive protocol with the secure processor 110 to initialize ORAM memories in the external RAM 214 that will be used to store A, X and y in encrypted form. Once complete, the ORAM memory after 0 steps is referred to as $M_0$. Decrypted data x is not revealed to the server during this interaction. After the process is complete, the secure processor 110 will be able to make ORAM read/write requests to the external RAM 214 to fetch instructions in A or data in x or y. Initialization should be done with care, to prevent attacks where the server 212 supplies public programs and data to the secure processor 110.

Step 4. The server 212 sends S to the secure processor 110 and the secure processor 110 spends a number of clock cycles and energy, corresponding to S, making forward progress in A. During this period of time, the secure processor 110 may make ORAM requests to the server 212 to request more instructions or data.

Step 5. The result of the server-secure processor interactions is an ORAM $M_S$, the program state after S cycles. The server 212 can either send the ORAM back to the user machine as is, or start an interactive protocol with the secure processor 110 to "unload" the ORAM to form ciphertext $M'_S$ (which is in some format that is more efficient for the user to decrypt).

Step 6. The user decrypts $M_S$ and checks whether S was sufficient to complete A(x, y). Without loss of generality, the algorithm may output an "I am done" message as part of its final encrypted result.

A correct execution of Π outputs to the client the evaluation A(x, y) (if S was sufficient) or some intermediate result.

The disadvantage of only two interactions is that the user may receive an intermediate result (rather than the final one) indicating that the computation was not finished. The advantage is no additional unnecessary privacy leakage about the final result; i.e., the server 212 does not gain additional understanding about the output of A evaluated on the unencrypted inputs besides what the server 212 is already able to extract from the algorithm itself, the number and sizes of the encrypted inputs, and other a-priori knowledge. It can be shown that this leakage is optimal.

To maintain security, the secure processor 110 initializes the ORAM memories such that when real computation begins, the following condition holds: For any two words d and d' in A, x or y: once the ORAM initialization step is complete, the server cannot tell whether an address in external RAM 214 stores encrypt(d) more likely than encrypt(d'). If this condition is not met, the server 212 can supply some A which exploits any bias to transmit and compromise private information about X.

Let $d_i$, $1 \le i \le n$, represent the words in A, x and y. To safely initialize the ORAM memories, the secure processor 110 encrypts and stores $(d_i, i)$ in external RAM 214 after which it uses Goodrich's randomized Shell sort algorithm to sort $(d_i, i)$ based on the lexicographical order of a keyed hash of $(d_i, i)$ for some randomly chosen key. According to their reordering, the $(d_i, i)$ are then written to ORAM. Goodrich's algorithm is data oblivious and only uses O(n log n) comparisons with a small constant factor. Being data oblivious implies that the $(d_i, i)$ are reordered according to a permutation in a way that prevents the server 212 from tracking the reordering.

During Step 4 (program execution) in the two-interactive protocol 200, the secure processor 110 assumes limited operating system-like support in the following sense: Since A can be an arbitrary/untrusted program, A can be wrapped in a virtual machine forming A' and A' can be run within Ascend in place of A. Since programs running on the secure processor 110 do not have to be trusted, any operating system code in the virtual machine is also untrusted.

As A' can only make external requests to ORAM, it can only implement certain operating system routines. It can, for example, implement memory management (e.g., malloc) by extending A with the malloc routines and storing the associated data structures in ORAM. It cannot make requests outside of the ORAM (such as asking for the world clock time or making arbitrary queries to the Internet, the latter being almost certainly too large to store in ORAM). The server 212 may periodically send the secure processor 110 specific pieces of information without being prompted (via black box access) but we do not consider those schemes in this example. Rather, it is assumed that the secure processor 110 runs A' in a sandbox that consists of the secure processor 110 and the external RAM 214.

In an example, a semi-honest security model is assumed for the secure processor 110. The server 212 is "honest but curious." The server 212 is honest in that it executes A under encryption for the required number of cycles and sends back the result exactly as specified (no deviations, malicious or otherwise). In particular, the server 212 does not send back to the user the result produced by executing a different algorithm, or evaluating A on different inputs, or evaluating A on the user's input for less than S cycles. The server will try to finish the user's program as best it can, given the number of cycles specified by the user, e.g., in order to get additional business from that user in the future.

The server 212 is curious in that it may try to learn as much as possible about the user's input from its view. The server's view is A, the encrypted inputs as given by the user, and black box access to the Ascend processor 110. The server 212 can monitor the secure processor's pins for timing/power input/output behavior, or apply its own inputs when it pleases. For example, the server 212 can run different programs on the user's inputs in order to try to learn something about the inputs by monitoring the secure processor 110 externally. When the server 212 applies a public program to the encrypted data, the server 212 has other a priori knowledge, such as the program's structure and offline profiling information, which it may have obtained by running the program on different inputs.

In an example, the secure processor 110 processor is a tamper-proof black box and is designed to meet the conditions for oblivious computation. To make the secure processor 110 oblivious given untrusted A, the following properties are specified:

1. The specific sequence of instructions needed to make forward progress in A must be obfuscated. That is, the secure processor 110 should appear to consume the same amount of time/energy to evaluate each instruction, given any pair $M_0$ and $M_0'$.
2. Both (a) the address sequence of external requests and (b) the times at which those requests are made must be indistinguishable for any pair $M_0$ and $M_0'$. The secure processor 110 uses an ORAM interface to make external requests thereby satisfying (a).

Observe that if both of these conditions are satisfied, the server's view of the secure processor 110 itself (condition 1) and the secure processor's input/output behavior (condition 2) is independent of $M_0$, which satisfies the properties for being oblivious.

Note that satisfying condition 1 perfectly is a circuit design and implementation problem. Here, we force the secure processor 110 to "go through the motions" of each possible instruction to make one instruction's worth of forward progress in A. Let PC' denote the dynamic program counter that changes based on data-dependent program conditions and assume that this value is stored inside the secure processor 110. At any given point in the execution of any given program, PC' points to exactly one instruction denoted I(PC') (we are assuming sequential program semantics, for example) in A which corresponds to one instruction type in the chosen ISA. To evaluate I(PC'), the secure processor 110 must speculatively evaluate each instruction in its ISA. If the current instruction it is evaluating matches the instruction type for I(PC'), the instruction successfully updates program state. Otherwise, no change in program state occurs but the secure processor 110 must still activate the circuits that it would have if the instruction were actually executed. We refer to this extra work as "dummy work." For example, if the secure processor 110 has an internal data memory and one of the instructions in its ISA accesses the memory, the secure processor 110 must access the memory (either with a real or dummy request) for every instruction that it evaluates. To be secure, dummy work must be indistinguishable from real work.

Satisfying the second part (b) in condition 2 is done by making predictable and periodic requests to the external RAM 214 that implements the ORAM. Conceptually, if every ORAM request takes a fixed number of clock cycles to complete then this condition can be satisfied if the secure processor 110 makes exactly one external request every T clock cycles. In actuality, the secure processor 110 will make a real request every T cycles if it has one to make, or a dummy request if it does not (for the same reason as in the previous paragraph). To maintain security, T is public, set by the server 212 and cannot depend on $M_0$. In a realistic setting, every ORAM request will take a variable number of cycles because of external bus traffic and physical NUMA (non-uniform memory architecture) constraints. To maintain the same level of security, it suffices for the secure processor 110 to make either a real or dummy request T cycles after the last request completed (e.g., arrived at the secure processor's input pins). As before, a dummy ORAM request must be indistinguishable from a real ORAM request.

The secure processor 110 can be implemented to support any ISA. In an example, the secure processor 110 is implemented to support MIPS. MIPS is easy to understand and similar to other and familiar RISC ISAs. Also, RISC ISAs in general tend to be composed of many simple instructions.

In general, obfuscated instruction execution scales in complexity with the union of the state updates performed over all instructions in the ISA. For example, most MIPS instructions read two operands from the register file (RF), perform a simple ALU-like operation, and write a single result. One can obfuscate these instructions by always performing 2 reads (real or dummy) to the RF, always firing the ALU (a collection of arithmetic circuits with a multiplexer at the output), and going through the motions of writing back to the RF. There are corner cases—such as floating point divide (fdiv). Here, we assume that complex instructions are broken into single-cycle mini-instructions (e.g., fdiv1, fdiv2, ... fdivN if fdiv is an N-cycle operation). To obfuscate the MIPS ISA, we perform the work of all mini-instructions that make up the ISA per-instruction executed.

Processor Architecture

The secure processor 110 has an internal ORAM interface to external RAM 214. The interface accepts a read/write request for a block of program data or instructions (using program addresses). A block in this setting is a region of consecutive (address, data) pairs and is analogous to a cache block in normal processors. Block size is fixed statically and known to the server 212. As soon as a request is made, the ORAM interface will start a variable-latency interactive protocol with the outside (untrusted) world and either return the requested block (on a read) or signal that the write completed successfully (To orient the reader, this interactive protocol takes thousands of clock cycles to complete). The amount of time/energy that it takes for the ORAM interface to initiate the request (e.g., lookup its internal state and setup signals to the secure processor's pins) is assumed to be independent of the request itself.

In an example, the secure processor 110 is architected with an emphasis on security first and performance second. To maintain security, we add architectural mechanisms to obfuscate program behavior (e.g., to perform dummy work and to make periodic memory requests to obfuscate ORAM usage. To increase performance, we extend the idea of making periodic requests to other processor operations (such as accessing internal data memory) to reduce the amount of total dummy work performed over time.

Figure 3A:
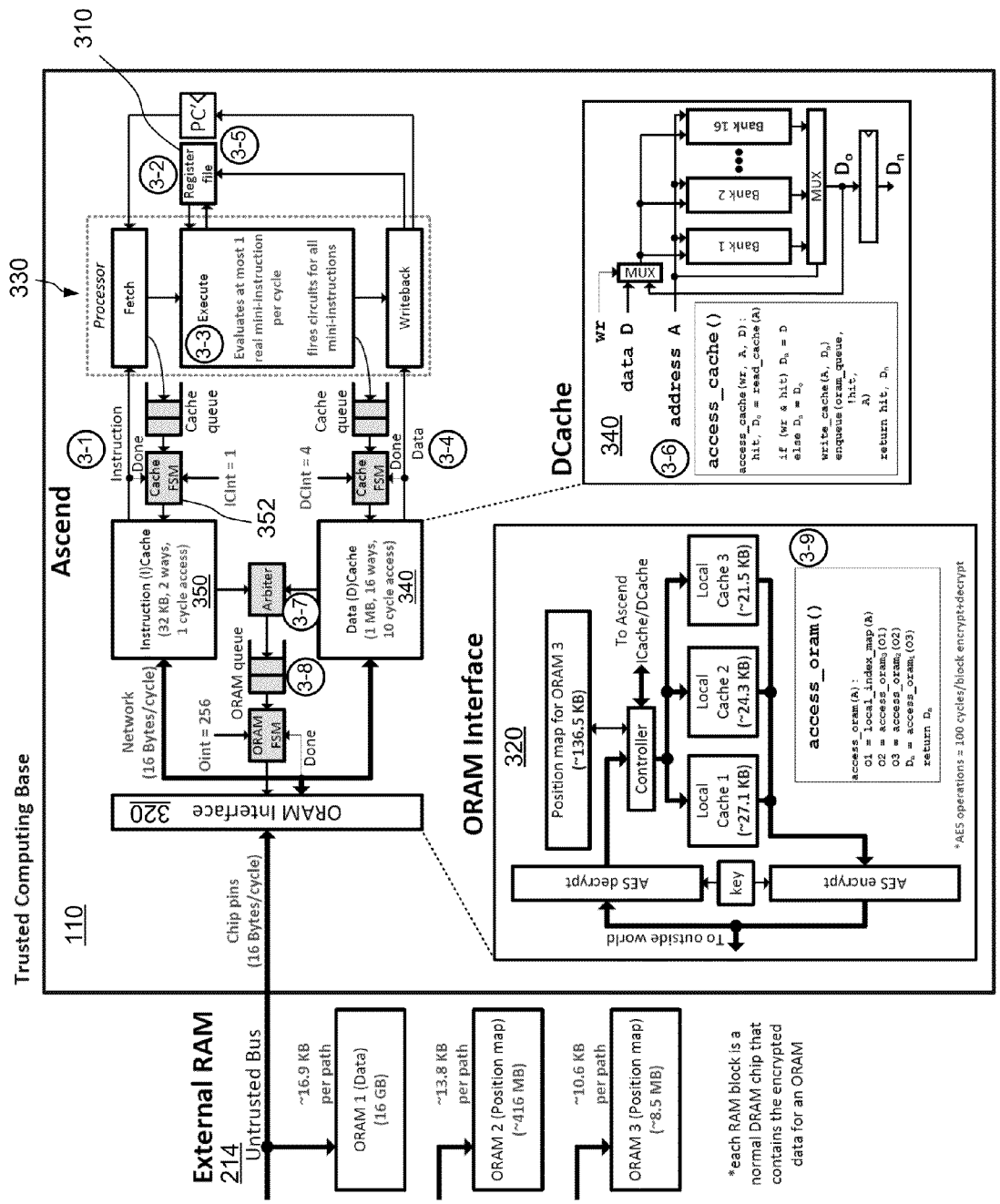
FIG. 3A is a detailed block diagram showing example components of the secure processor of FIG. 1.

FIG. 3A shows the architecture 300 of the secure processor 110 in greater detail. FIG. 3B shows calculated cycles to get a block of data/instructions from the ORAM interface. The secure processor 110 is made up of the following main components: (a) familiar register file (RF) 310 and cache resources, (b) several security-specific structures that will be used to make different types of requests at periodic intervals, (c) an ORAM interface 320, and (d) a fetch-execute pipeline ("Processor") 330 capable of evaluating obfuscated instructions. Subsets of M and A are stored in data cache 340 (DCache) and instruction cache (ICache) 350 memory, respectively.

At a high level, evaluating an instruction with the processor 330 looks like it would on a normal processor. Each instruction first accesses the ICache 350 with the current PC' to get I(PC') (labeled with encircled number 3-1 in FIG. 3A). Once I(PC') is fetched and decoded, the processor 330 interacts with the RF 310 to get instruction operands (3-2), uses its execution units to compute results (e.g., the ALU for arithmetic operations, 3-3), and writes back results to the RF 310 (3-5). When the processor 330 needs a word from data memory, it makes an access to the DCache 340 which either hits or misses (3-4). On a hit (3-6), a word of data is returned and the processor 330 continues execution. On a miss (3-6), the DCache 340 makes a request to the ORAM interface (3-7 and 3-8, 3-9). ICache misses are handled in the same way. Note that all cache accesses return a single word of data but misses and evictions bring in whole data blocks from the ORAM interface 320. The processor 330 is decoupled from the ORAM interface 320 by the caches 340 and 350.

For the rest of this description, only MIPS operations that access memory are said to access ORAM. These operations are instruction fetch, lw (load) and sw (store) operations (and their variants) Like a normal MIPS processor, the MIPS registers are stored in the RF 310 and the processor 330 never needs to make an ORAM request to read/write an element in the RF 310.

To preserve security, the secure processor 110 obfuscates program execution at three levels.

Level 1: Instruction Obfuscation.

To fetch an instruction, PC' is added to the ICache queue (3-1). When the cache request is serviced, I(PC') is decoded and the maximum number of reads needed for an arbitrary instruction (=2 for MIPS) are made to the RF 310 (3-2). If I(PC') requires fewer than 2 operands, some of the RF requests are dummy requests. Next (3-3), all arithmetic execution units (ALU, etc) are invoked, and the DCache queue enqueues a read/write request (for memory instructions). Nonmemory instructions go through the motions of adding a request to the DCache queue, but do not actually add the request (3-4), e.g., by de-asserting a queue write-enable flag or read/writing an entry. Finally, results are written back to the RF 310 (3-5). To fully obfuscate RF writeback, we writeback the operand for B-type and sw instructions, causing no logical change in RF state. If no instruction can be executed (which may happen because of a cache miss, described below), a dummy instruction that performs all of the actions described above is executed instead.

Level 2: Cache Obfuscation.

A pending request in a cache queue is only serviced cache interval cycles after the cache completes its last request. We refer to this interval as DCINT for the DCache and ICINT for the ICache—both intervals are public/static parameters that are set by the server 212. To block requests from accessing a cache's data arrays, a dedicated hardware structure called the cache FSM (finite state machine) 352 ticks a counter once per cycle from 0 ... cache interval–1 (during which time the FSM 350 is in the PENDING state) and sends exactly one pending request to the cache once the counter hits its maximum value (at which time it transitions to the ACCESS state). Requests sent to the cache perform the access_cache( ) operation (3-6) and add a new request to the ORAM queue in the event of a cache miss (3-8). As before, the system must go through the motions of adding a new request to the ORAM queue in the event of a cache hit. This means that real or dummy traffic will travel from the DCache 340 once every DCINT+DCACCESS cycles (where DCACCESS is the DCache cycle latency) and once every ICINT+ICACCESS cycles for the ICache 350. The arbiter (3-7) resolves conflicts to the ORAM queue when they occur by stalling the DCache request by a single cycle. Equivalently, the ICache request can be stalled. The server 212 can determine which takes priority statically. Since the cache latencies and interval values are known to the server 212, the server 212 knows when conflicts will occur. Once the request is complete, which the cache signals with a done flag, the cache FSM 352 transitions back to the PENDING state and the process repeats. If there is no pending request in the cache queue when the FSM 352 transitions to the ACCESS state, a dummy request (which performs the same operation as access_cache( ) with a dummy address/data) is made to the cache. While either a real or dummy request is being serviced, the processor 330 continues to fetch/execute (possibly dummy) obfuscated instructions.

Level 3: ORAM Access Obfuscation.

A pending request in the ORAM queue is only serviced by the ORAM interface 320 ORAM interval (OINT) cycles after the ORAM interface 320 completes its last request. Similar to the cache FSM/queue, an ORAM FSM and ORAM queue stores and regulates when ORAM requests are made. Once the OINT cycle threshold is met, either a pending request or a dummy request is sent to the ORAM interface and access_oram( ) is used to retrieve the program data/instructions (3-7).

Queuing and Flow Control.

A subtle but significant point is that the cache and ORAM FSMs do not reset until the cache/ORAM interface sets a done signal. Since the ORAM interface interacts with the outside world (which is controlled by the server 212), the latency for an ORAM request to complete is not generally predictable. For this reason, the processor 330 cannot blindly initiate ORAM requests at fixed intervals and instead uses flow control to wait until the previous request(s) complete (here, we assume one outstanding request at any time).

Microarchitecture of Primitive Blocks.

The processor 330 assumes that it has access to cache, RF and FIFO queue resources—all of which must be architected to make a specific request look like an arbitrary request. FIG. 3A (at 3-6) illustrates an example approach for the DCache resource. All accesses to the DCache 340 (either reads or writes) perform both a read and a write. If the access was a read, the old cache block is first read out of the cache into a holding register and then written back to the cache unchanged. In systems with large caches, physical access latency and energy per access changes based on where in the cache is being accessed. To address this issue, we split the cache into banks (which are analogous to ways in a normal cache) and access each bank on each access. Banks are monolithic in that an observer should not be able to distinguish between one address in the bank being accessed versus another (banks may be 64 KB, for example). Note that since the ICache 350 is read-only, it need only perform a read.

Setting Interval Parameters.

The cache queues and ORAM queue each require their associated interval parameters (ICINT, DCINT and OINT) to be set by the server 212.

Figure 4:
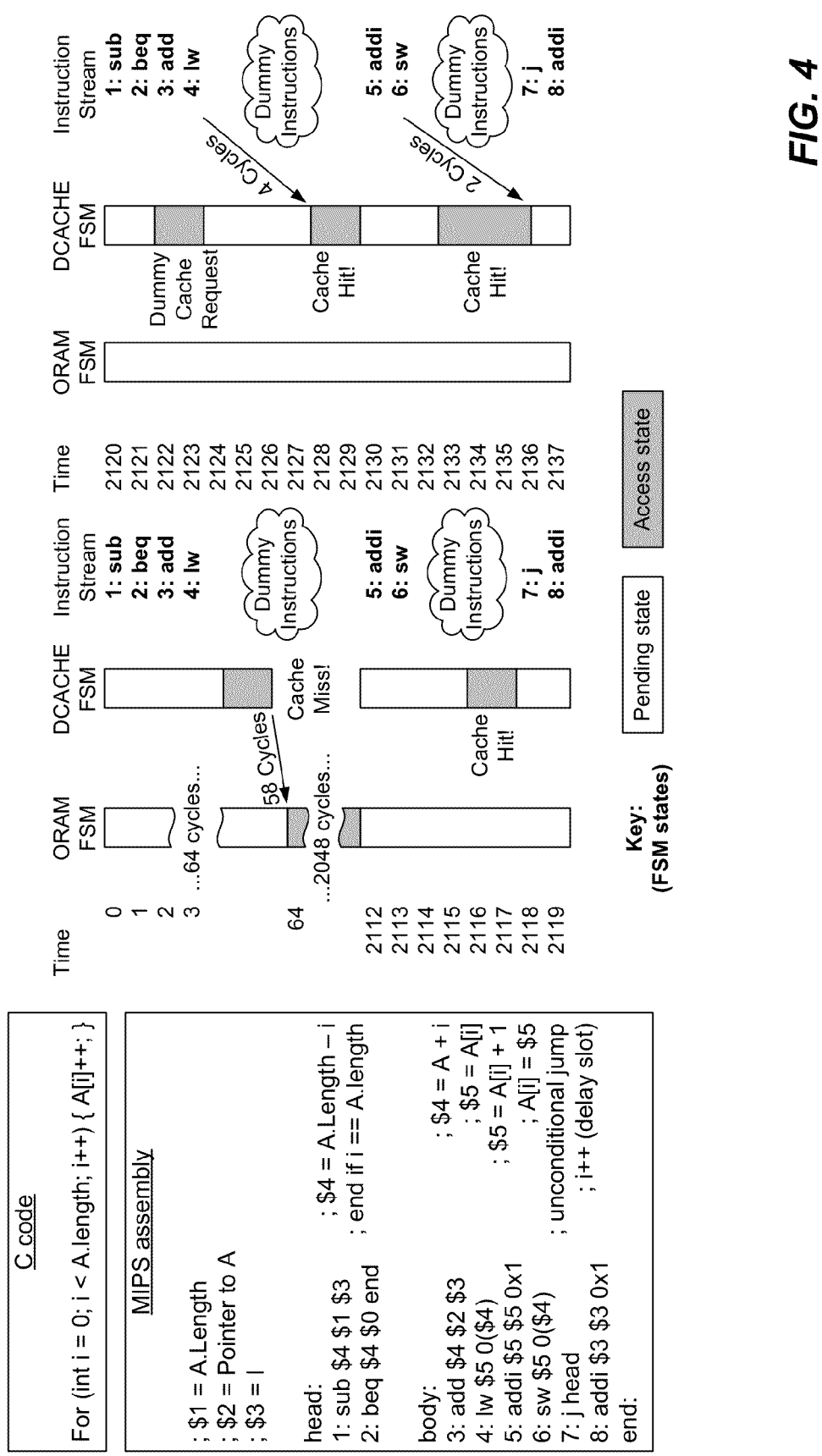
FIG. 4 is a diagram illustrating example program execution of the secure processor of FIGS. 1 and 3A.

FIG. 4 shows an example program (left) and how performance is impacted by the OINT and DCINT parameters (right). OINT=64 and DCINT=4. The ORAM/cache block size is 8 words. Accessing the DCache 340 takes 2 cycles and accessing the ORAM interface 320 takes 2048 cycles (chosen to be realistic). Arrows labeled with cycle latencies indicate Ascend stalls (during which time dummy instructions are issued) due to the choice of DCINT and OINT.

Since the server 212 knows that every instruction in A requires an ICache access, it should set ICINT=0 to maximize performance. DCINT is chosen based on A's instruction mix. If the server 212 has observed that A has a high percentage of memory instructions (through offline profiling on other inputs, etc.), it may decrease DCINT which increases the rate at which DCache accesses are made. In FIG. 4, the server 212 sees that the loop is made up of 8 instructions, 2 of which access memory. So, a basic strategy would be to set DCINT=8/2=4 (a setting which we use in the figure). If DCINT is too low, however, more cache requests will be dummy requests (e.g., the DCache access at t=2122), which means that the processor 330 must wait for up to DCINT+DCACCESS (=6) additional cycles.

The server 212 chooses OINT based on how frequently it thinks A will incur a cache miss. In FIG. 4, the server 212 knows that the program is striding through memory and that the cache block size is 8 words. The server 212 can then reason: each loop iteration is 8 instructions and the program increments its stride by 1 per loop iteration. Thus, the program will need a new cache block every 8 loop iterations (≈64 cycles). A first-order setting for OINT is therefore 64. Because dummy ORAM requests are very costly (up to an additional 64+2048 cycles in this example), however, a conservative server would probably add some slack to OINT.

The above analysis is specific to this small loop as real programs have phases and different program phases have different memory access behaviors, requiring different DCINT/OINT settings. It may be possible for the server 212 to "guess" the program phase as time progresses, without feedback from the secure processor 110. For this example, however, we set each interval parameter once at the start of execution.

ORAM Interface

ORAM has the property that its interface completely hides the data access pattern (which blocks were read/written) from the external RAM 214; from the perspective of the external RAM 214, read/write operations are indistinguishable from random requests. ORAM only considers hiding the data access pattern and not the times at which read/write operations are requested.

The ORAM interface between the secure processor 110 and external RAM 214 is secure if for any two data request sequences (produced by the secure processor 110) of the same length, their access patterns to external RAM 214 (produced by the interface) are computationally indistinguishable by anyone but the secure processor 110. This guarantees that no information is leaked about the data accessed by the secure processor 110, how it was accessed (read, write, sequential, random, etc.), and whether it was accessed before.

Figure 5:
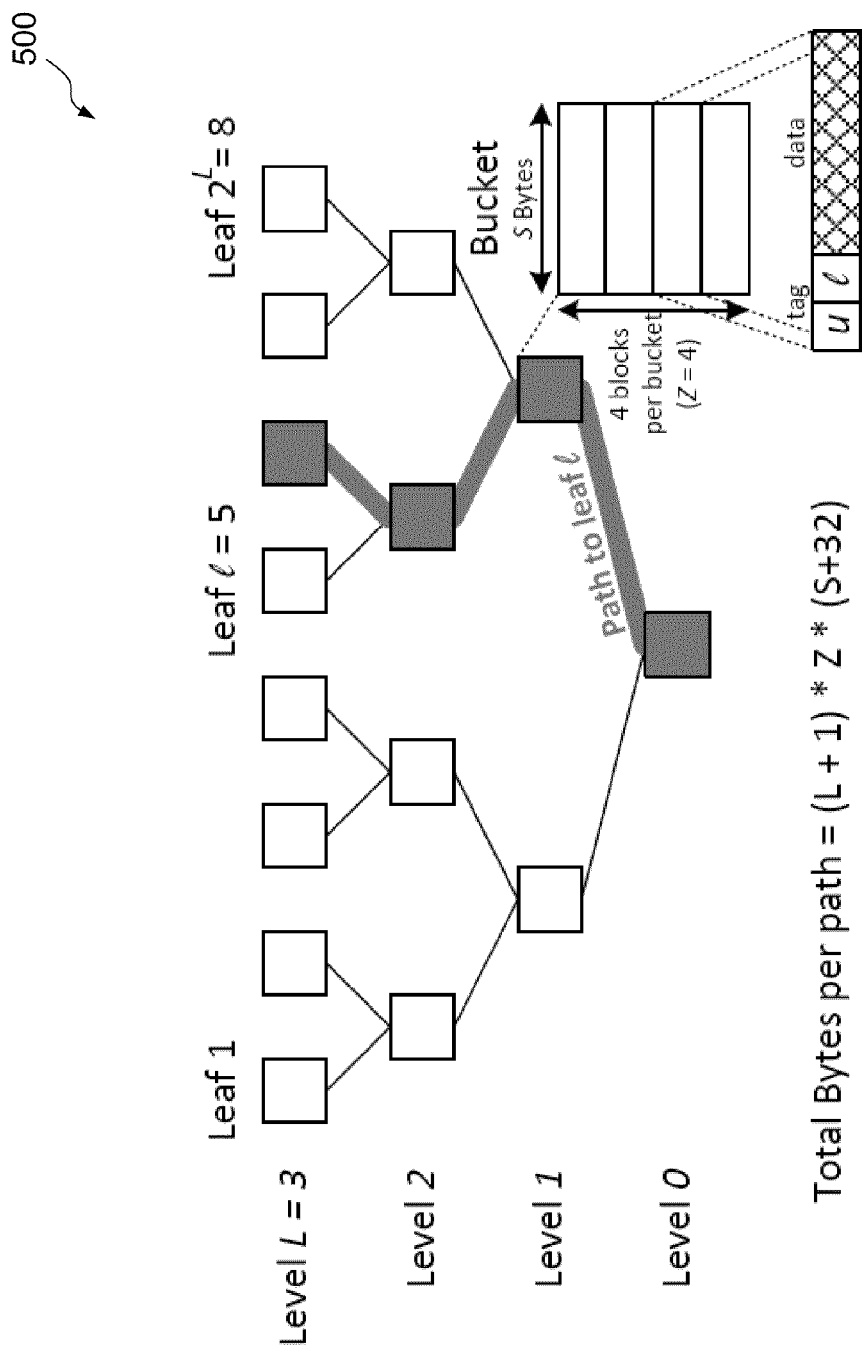
FIG. 5 is a block diagram of an example Path ORAM tree organization.

Path ORAM is a simple and practical ORAM approach and may be used implement the ORAM in the external RAM 214. The Path ORAM protocol uses a small local cache of C data blocks. As shown in FIG. 5, the external RAM 214 is treated as a binary tree 500 where each node is a bucket that can hold up to Z encrypted blocks (we will use Z=4). In order to obtain a capacity of $N=2^{L+1}$ data blocks, the tree 500 needs L+1 levels, its root at level 0 and its $2^L$ leafs at level L. Each leaf is labeled by L bits. Blocks have (L+1)-bit addresses.

Initially, when no data has been written, all blocks in the tree 500 are all-zero. The protocol uses randomized encryption before it writes data blocks back to external RAM 214 such that only with very small probability the external RAM 214 is able to learn whether two data encryptions correspond to the same data.

Encryption is based on 128-AES: Let K be the symmetric key shared with the user. Let S be the plain data block size in bytes. To encrypt a block consisting of S=16 chunks $D_i$, $1 \le i \le S/16$, of 128 bits with (L+1)-bit block address u and an L-bit leaf-label l to which the address is mapped, a random key K' is selected and the ciphertext $(AES_K(K''), AES_{K'}(0)$ XOR $(u\|l\|0); AES_{K'}(1)$ XOR $D_1, \ldots, AES_{K'}(S/16)$ XOR $D_S/16)$ of S+32 bytes is formed.

The ORAM is capable of storing NS data bytes. The ORAM itself has a data structure that uses $2^{L+1}Z(S+32)$ bytes. The cache stores $C(S+\lceil d(2L+1)/8 \rceil)$ bytes; the plain data of each block together with the address and leaf-label.

Citing from "Path O-RAM: An Extremely Simple Oblivious RAM Protocol" (E. Stefanov and E. Shi., Cornell University Library, arXiv:1202.5150v1, 2012. arxiv.org/abs/1202.5150), "We maintain the invariant that at any time, each data block is mapped to a uniformly random leaf bucket in the tree, and uncached blocks are always placed in some bucket along the path [from the root] to the mapped leaf. Whenever a block is read from the [external RAM 214], the entire path to the mapped leaf is [decrypted and] read into the cache, the requested block is remapped to another leaf, and then the path is [re-encrypted and] written back to the [external RAM 214]. When the path is written back to the [external RAM 214], additional blocks in the cache may be evicted into the path as long as the invariant is preserved and there is remaining space in the buckets. . . . [the secure processor 110] stores a position map array position [u] that consists of N integers, mapping each block u to one of the 2L leafs [in the external RAM's] tree data structure [500]. The mapping is random and hence multiple blocks may be mapped to the same leaf and there may exist leafs to which no blocks are mapped. The position map changes over time as blocks are accessed and remapped."

The position map is an array of NL bits. For our parameter settings this (~416 MB) is too large for the secure processor's on-chip memory. For this reason we use the following extension. We propose to extend the data Path O-RAM $ORAM_1$ with a second Path O-RAM $ORAM_2$ and a third Path O-RAM $ORAM_3$ that store the position map of $ORAM_1$ and $ORAM_2$, respectively.

Let $N_2, L_2, S_2, C_2, N_3, L_3, S_3$ and $C_3$ together with Z=4 be the parameters of $ORAM_2$ and $ORAM_3$. Since the position map of $ORAM_1$ has N L-bit labels and each block in $ORAM_2$ is able to store $k_2=[8S_2/L]$ labels, the capacity of $ORAM_2$ must be at least $N_2=[N=k2] \approx NL=(8S_2)$ with $L_2=[\log_2 N_2]-1$ levels. Similarly, for $k_3=[8S_3=L_2], N_3=[N_2/k_3] \approx [N_2L_2=(8S_3)$ and $L_3=[\log_2 N_3]-1$. The position map of $ORAM_3$ has size $N_3L_3/8$ Bytes (~136.5 KB) and is stored in the secure processor 110.

Figure 6:
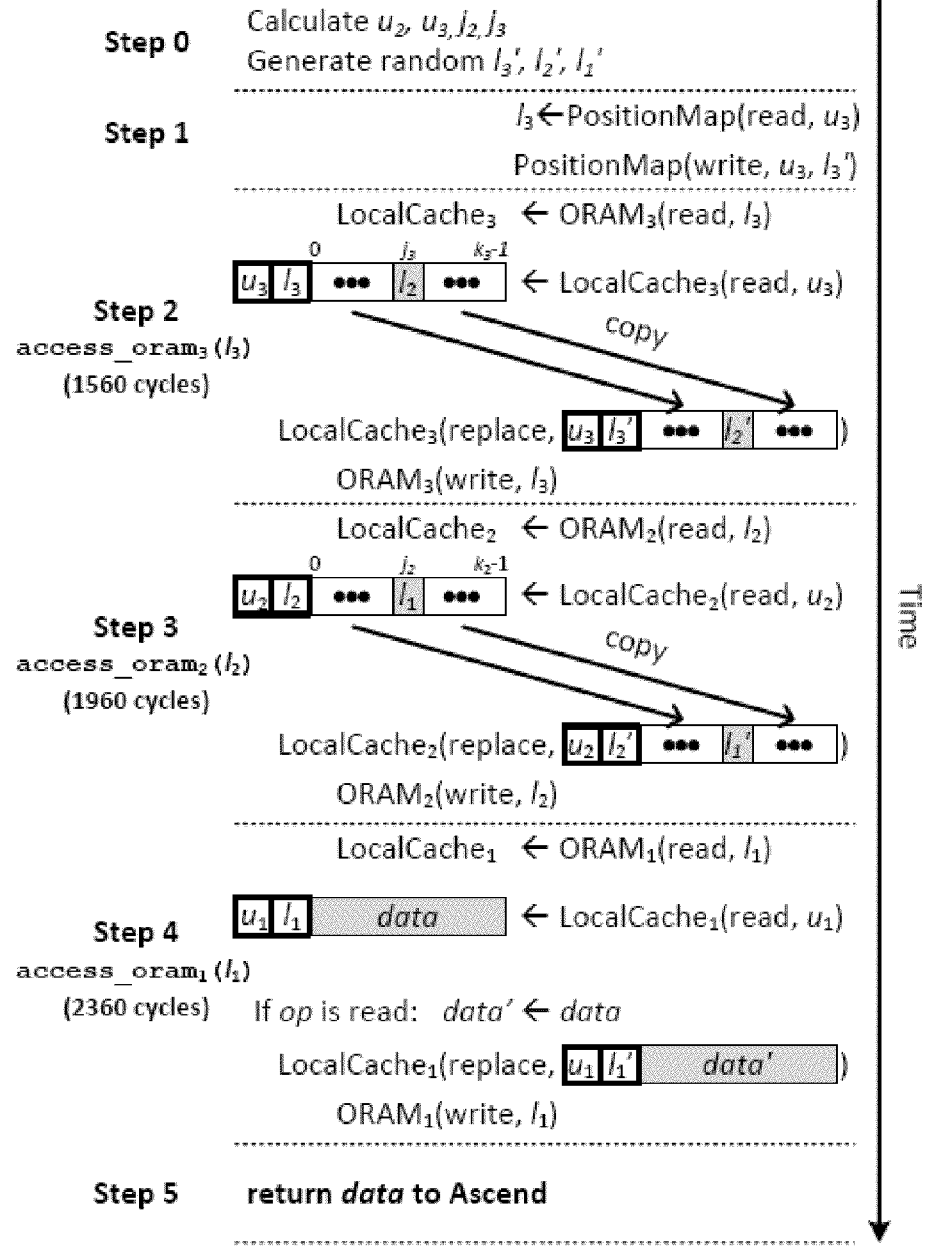
FIG. 6 is a diagram showing an example read or write request in a hierarchical Path O-RAM.

FIG. 6 explains a read or write request to a block in $ORAM_1$ with address $u_1$. In Step 0, the algorithm computes addresses $u_2=[u_1/k_2]$ and $u_3=[u_2/k_3]$ and indices $i=u_1-u_2k_2$ and $j=u_2-u_3k_3$. The invariant of the hierarchical path O-RAM data structure is that the leaf-label $l_1$ corresponding to address $u_1$ in $ORAM_1$ is stored in the L data bits with positions $[L_i, \ldots, L(i+1)-1]$ of the block with address $u_2$ in $ORAM_2$. Similarly, the leaf-label $l_2$ corresponding to address $u_2$ in $ORAM_2$ is stored in the $L_2$ data bits with positions $[L_2j, \ldots, L_2(j+1)-1]$ of the block with address $u_3$ in $ORAM_3$. The leaf-label $l_3$ corresponding to address $u_3$ in $ORAM_3$ is stored in the position map.

In Step 1 the position map is used to retrieve label $l_3$ and to replace it with another random label $l'_3$. In Step 2 the blocks in the buckets along the path from the root to the leaf with label $l_3$ in $ORAM_3$ are read; this includes decrypting the blocks and putting the blocks with non-zero address into $LocalCache_3$. From $LocalCache_3$ the block with address $u_3$ and label $l_3$ is read, label $l_2$ is retrieved and replaced by a random label $l'_2$, and label $l_3$ is replaced by $l'_3$. If the block with address $u_3$ does not exist in $LocalCache_3$, then a new block with address $u_3$, label $l'_3$, and $l'_2$ stored in its data bits, is added to the cache. Finally, in Step 2, the algorithm evicts and encrypts as many blocks from $LocalCache_3$ into the path with label $l_3$ in $ORAM_3$ (encrypted dummy blocks are used to fill the path where necessary).

The same or similar procedure repeats itself in Steps 3 and 4 for $ORAM_2$ and $ORAM_1$, respectively. The end result is that labels $l_1, l_2,$ and $l_3$ have been randomized and only the paths to $l_1, l_2,$ and $l_3$ have been read and written back; the randomization guarantees the security of the hierarchical path O-RAM. The invariant is again satisfied and in the meantime the data corresponding to $u_1$ has been read and replaced by new data in case of a write request.

The algorithm reads (L+1)Z(S+32) bytes and writes (L+1)Z(S+32) bytes to $ORAM_1$, reads/writes $2(L_2+1)Z(S_2+32)$ bytes to $ORAM_2$ and reads/writes $2(L_3+1)Z(S_3+32)$ bytes to ORAM$_3$. For a pin count of P=16 bytes, the algorithm introduces a latency of $2Z((L+1)(S+32)+(L_2+1)(S_2+32)+(L_3+1)(S_3+32))$=P cycles for reading and writing the external RAM 214. We derive access latencies for the parameterization that we use in our evaluation in FIG. 3.

Figure 7:
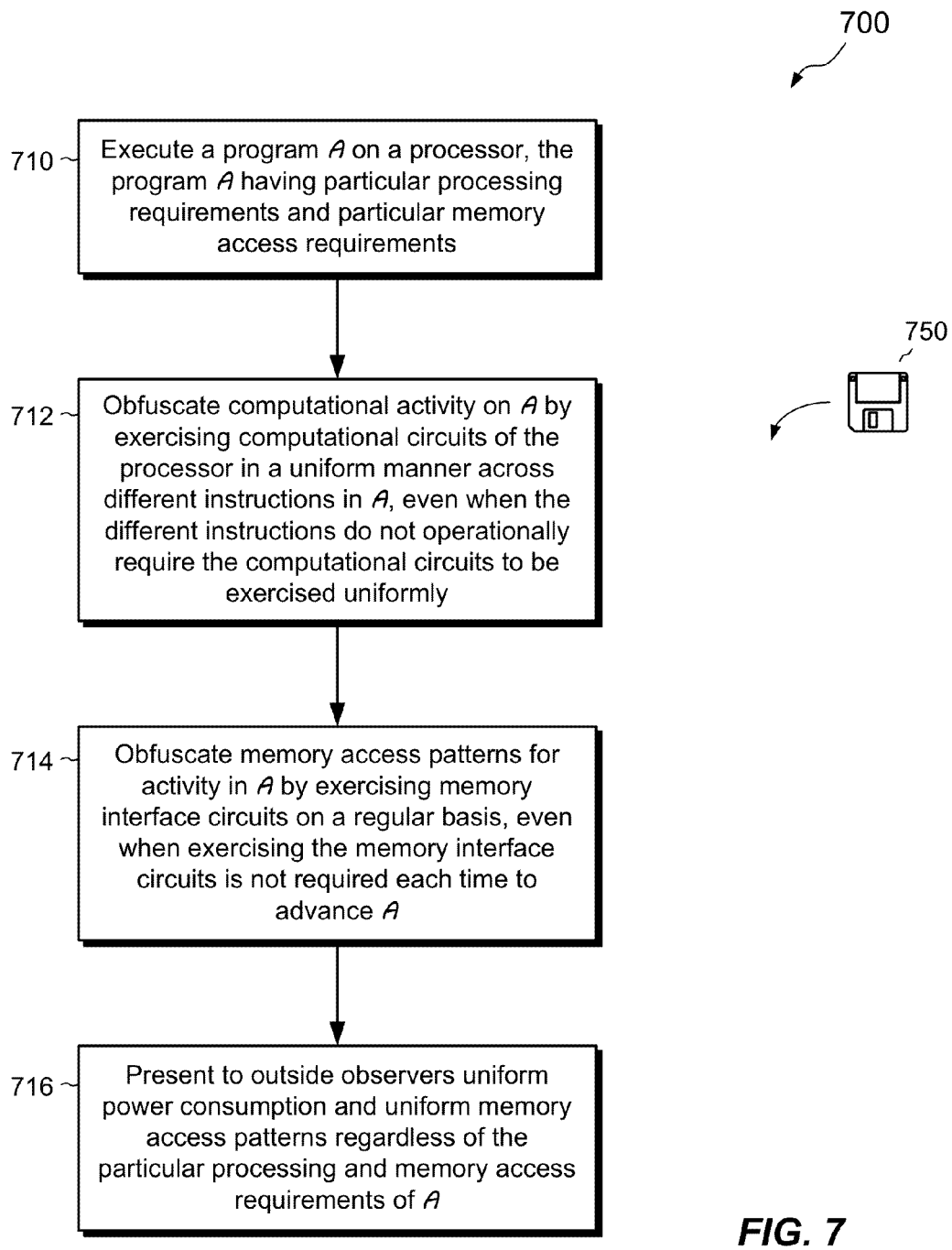
FIG. 7 is a flowchart showing an example process for secure processing using the processor of FIGS. 1 and 3A.

FIG. 7 illustrates a process 700 that may be carried out in connection with the processor 110. The various acts of the process 700 may be ordered in any suitable way. Accordingly, embodiments may be constructed in which acts are performed in orders different from those illustrated, which may include performing some acts simultaneously, even though the acts are shown as sequential in the illustrated embodiments.

At step 710, a program A is executed on a processor. The program A has particular processing requirements and particular memory requirements. For example, a program, such as a tax preparation program may be executed on the processor 110 in a cloud computing environment.

At step 712, computational activity on A is obfuscated by exercising computational circuits of the processor in a uniform manner across different instructions in A, even when the different instructions do not operationally require the computational circuits to be exercised uniformly (e.g., regardless of whether the uniform manner of exercising the computational circuits is required for the different instructions). For example, as described above, any MIPS instruction can always perform two reads and always fire an ALU, regardless of whether the particular MIPS instruction requires two reads or requires an arithmetic operation.

At step 714, memory access patterns are obfuscated for activity in A by exercising memory interface circuits on a regular basis, even when exercising the memory interface circuits is not required each time to advance A (e.g., regardless of whether exercising the memory interface circuits is required each time to advance A). For example, as described above, predictable and periodic requests can be made to the external RAM 214 that implements the ORAM, regardless of whether the program calls for such memory accesses.

At step 716, uniform power consumption and uniform memory access patterns are presented to outside observers, regardless of the particular processing and memory access requirements of A.

An improved technique has been described for secure computation, which obfuscates program execution such that observers cannot detect what instructions are being run at any given time. Rather, program execution and memory access patterns are made to appear uniform. In one example, obfuscation is achieved by exercising computational circuits in a similar way for a wide range of instructions, such that all such instructions, regardless of their operational differences, affect the processor's power dissipation and processing time substantially uniformly. In another example, obfuscation is further achieved by limiting memory accesses to predetermined time intervals, with memory interface circuits exercised regardless of whether a running program requires a memory access or not.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Also, the improvement or portions thereof may rendered as a software simulation or emulation of the secure processor 110, embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 750 in FIG. 7). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method of performing secure computation, comprising:
   executing a program on a processor, the program having particular processing requirements and particular memory access requirements;
   obfuscating computational activity on the program by exercising computational circuits of the processor in a uniform manner across different instructions in the program, even when the different instructions do not operationally require the computational circuits to be exercised uniformly; and
   obfuscating memory access patterns for activity in the program by exercising memory interface circuits on a regular basis, even when exercising the memory interface circuits is not required each time to advance the program,
   wherein processor presents to outside observers uniform power consumption and uniform memory access patterns regardless of the particular processing and memory access requirements of the program, and
   wherein the processor has an instruction set architecture (ISA) and a program counter pointing to an instruction of the ISA in the program, and wherein obfuscating computational activity in the program includes, for each one of multiple instructions in the ISA:
     testing whether the one of multiple instructions matches the instruction of the ISA pointed to by the program counter;
     updating a program state of the program when the one of multiple instructions matches the instruction of the ISA pointed to by the program counter; and
     activating the circuits of the processor to simulate updating the program state of the program when the one of multiple instructions does not match the instruction of the ISA pointed to by the program counter.

2. The method of claim 1, wherein the ISA is MIPS (Microprocessor Without Interlocked Pipeline Stages), wherein performing multiple MIPS instructions includes, for each of the MIPS instructions, always performing two reads to a register file, regardless of whether the particular MIPS instruction requires two reads, and always firing an arithmetic logic unit (ALU), regardless of whether an arithmetic operation is specified.

3. The method of claim 1, wherein the memory has an initial state prior to execution of the program, and wherein obfuscating memory access includes:

making exactly one request to the memory every T processor cycles, T being a predetermined positive integer, wherein the request is followed by an actual exchange of data related to the program if the program has a request to make, and is followed by no actual exchange of data related to the program if the program has no request to make, and wherein T does not depend on the initial state of the memory.

4. The method of claim 1, wherein the memory has an initial state prior to execution of the program, and wherein obfuscating memory access includes:

making exactly one request to the memory T processor cycles after each previous request was completed T being a predetermined positive integer, wherein each request is followed by an actual exchange of data related to the program if the program has a request to make, and is followed by no actual exchange of data related to the program if the program has no request to make, and wherein T does not depend on the initial state of the memory.

5. The method of claim 1, further comprising:

prior to executing the program, sharing, by the processor, a secret encryption key with a user machine; and engaging in an interactive protocol with a server, including (i) initializing an oblivious RAM (ORAM) residing in the memory and having an initial state at zero processor cycles, (ii) storing in the ORAM the program A and encrypted ciphertext from the user machine, the server having previously received the encrypted cyphertext from the user machine, wherein the encrypted cyphertext represents user inputs x encrypted with the secret encryption key, and (iii) storing in the ORAM a predetermined number of compute cycles of the processor, which designates a predetermined time/energy budget for computing on the program;

wherein executing the program on the processor includes spending, by the processor, a number of cycles and energy, corresponding to the predetermined number of compute cycles, to make forward progress in A and to create an ORAM state, which represents a program state of the program after the predetermined number of compute cycles.

6. The method of claim 5, wherein engaging in the interactive protocol with the server further includes storing a second set of inputs from the server in the ORAM.

7. The method of claim 6, further comprising, after engaging in the interactive protocol, making ORAM read and write requests to the memory to fetch instructions in the program and to fetch data in the set of inputs and the second set of inputs.

8. The method of claim 7, further comprising directing the server to send the contents of ORAM back to the user machine.

9. The method of claim 8, wherein directing the server to send the contents of ORAM back to the user machine includes engaging in a second interactive protocol with the server to unload the ORAM to form ciphertext that is more efficient for the user machine to decrypt than the contents of the ORAM.

10. The method of claim 5, wherein the predetermined number of compute cycles is received from the user machine and specified by a user.

11. The method of claim 10, wherein the contents of ORAM provide an incomplete, intermediate computing result of the program, in response to greater than the predetermined number of compute cycles of the processor being required to complete the program.

12. A processor for performing secure computation, comprising:

computational circuits; and memory interface circuits, wherein the processor is constructed and arranged to:

execute a program, the program having particular processing requirements and particular memory access requirements;

obfuscate computational activity on the program by exercising the computational circuits in a uniform manner across different instructions in the program, even when the different instructions do not operationally require the computational circuits to be exercised uniformly;

obfuscate memory access patterns for activity in the program by exercising the memory interface circuits on a regular basis, even when exercising the memory interface circuits is not required each time to advance the program; and present to outside observers uniform power consumption and uniform memory access patterns regardless of the particular processing and memory access requirements of the program, the processor further comprising an instruction set architecture (ISA) and a program counter for pointing to an instruction of the ISA in the program, wherein, when constructed and arranged to obfuscate computational activity on the program, the processor is configured, for each of multiple instructions in the ISA, (i) to test whether the instruction matches the instruction of the ISA pointed to by the program counter, (ii) to update a program state of the program when the instruction matches the instruction of the ISA pointed to by the program counter, and (iii) to activate the circuits of the processor to simulate updating the program state of the program when the instruction does not match the instruction of the ISA pointed to by the program counter.

13. The processor of claim 12, wherein the program is stored in a memory having an initial state prior to execution of the program, and wherein, when constructed and arranged to obfuscate memory access, the processor is configured to make exactly one request to the memory T processor cycles after each previous request was completed, T being a predetermined positive integer, wherein each request is followed by an actual exchange of data related to the program if the program has a request to make, and is followed by no actual exchange of data related to the program if the program has no request to make, and wherein T does not depend on the initial state of the memory.

14. The processor of claim 13, wherein the contents of ORAM provide an incomplete, intermediate computing result of the program, in response to greater than a predetermined number of compute cycles of the processor being required to complete the program.

15. A non-transitory computer-readable medium including instructions which, when executed by a processor of a computing device, cause the processor to perform a method of performing secure computation, the method comprising:

executing a program on a processor, the program having particular processing requirements and particular memory access requirements;

obfuscating computational activity on the program by exercising computational circuits of the processor in a uniform manner across different instructions in the program, even when the different instructions do not operationally require the computational circuits to be exercised uniformly; and obfuscating memory access patterns for activity in the program by exercising memory interface circuits on a regular basis, even when exercising the memory interface circuits is not required each time to advance the program, wherein processor presents to outside observers uniform power consumption and uniform memory access patterns regardless of the particular processing and memory access requirements of the program, and wherein the processor has an instruction set architecture (ISA) and a program counter pointing to an instruction of the ISA in the program, and wherein obfuscating computational activity in the program includes, for each one of multiple instructions in the ISA:

testing whether the one of multiple instructions matches the instruction of the ISA pointed to by the program counter;

updating a program state of the program when the one of multiple instructions matches the instruction of the ISA pointed to by the program counter; and activating the circuits of the processor to simulate updating the program state of the program when the one of multiple instructions does not match the instruction of the ISA pointed to by the program counter.

16. The non-transitory computer-readable medium of claim 15, further comprising:

prior to executing the program, sharing, by the processor, a secret encryption key with a user machine;

receiving, by a server from the user machine, encrypted ciphertext, wherein the encrypted ciphertext represents a set of user inputs encrypted with the secret encryption key shared between the user machine and the processor;

receiving, by the server from the user machine, a predetermined number of compute cycles of the processor, which designates a predetermined time/energy budget for computing on the program; and engaging in an interactive protocol with the server, including (i) initializing an oblivious RAM (ORAM) residing in the memory and having an initial state at zero processor cycles, (ii) storing in the ORAM the program and the encrypted ciphertext from the user machine, wherein executing the program on the processor includes spending, by the processor, a number of cycles and energy, corresponding to the predetermined number of compute cycles, to make forward progress in the program and to create an ORAM state that represents a program state of the program after the predetermined number of processor cycles.

17. The non-transitory computer-readable medium of claim 15, wherein the contents of ORAM in the ORAM state provide an incomplete, intermediate computing result of the program, in response to greater than the predetermined number of compute cycles of the processor being required to complete the program.

* * * * *